United States Patent
Kim et al.

(10) Patent No.: US 10,715,823 B2
(45) Date of Patent: Jul. 14, 2020

(54) METHOD AND APPARATUS FOR EXECUTING DECODING COMMAND, METHOD AND APPARATUS FOR GENERATING DECODING COMMAND, AND RECORDING MEDIUM

(71) Applicant: SAMSUNG ELECTRONICS CO., LTD., Suwon-si (KR)

(72) Inventors: Doo-hyun Kim, Seoul (KR); Do-hyung Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 279 days.

(21) Appl. No.: 15/301,169

(22) PCT Filed: Mar. 31, 2015

(86) PCT No.: PCT/KR2015/003168
§ 371 (c)(1),
(2) Date: Sep. 30, 2016

(87) PCT Pub. No.: WO2015/152606
PCT Pub. Date: Oct. 8, 2015

(65) Prior Publication Data
US 2017/0026657 A1    Jan. 26, 2017

(30) Foreign Application Priority Data
Mar. 31, 2014    (KR) ........................ 10-2014-0037962

(51) Int. Cl.
*H04N 7/12*         (2006.01)
*H04N 19/42*      (2014.01)
(Continued)

(52) U.S. Cl.
CPC ............. *H04N 19/42* (2014.11); *H04N 19/13* (2014.11); *H04N 19/157* (2014.11); *H04N 19/176* (2014.11); *H04N 19/91* (2014.11)

(58) Field of Classification Search
CPC ...... H04N 19/44; H04N 19/61; H04N 19/436; H04N 19/91; H04N 19/13; H04N 19/136;
(Continued)

(56) References Cited

U.S. PATENT DOCUMENTS

| 7,079,057 B2 | 7/2006 | Kim et al. |
| 7,411,529 B2 | 8/2008 | Park et al. |

(Continued)

FOREIGN PATENT DOCUMENTS

| KR | 10-2006-0013021 A | 2/2006 |
| KR | 10-2006-0082199 A | 7/2006 |

(Continued)

OTHER PUBLICATIONS

Communication dated Jun. 24, 2015 issued by the International Searching Authority in counterpart International Application No. PCT/KR2015/003168.

*Primary Examiner* — Masum Billah
(74) *Attorney, Agent, or Firm* — Sughrue Mion, PLLC (57) ABSTRACT

Disclosed is a method of executing a decoding command. A method of executing a decoding command includes acquiring the decoding command, determining a type of an executable operation on the basis of the acquired decoding command, and performing any one of an operation of storing context information about an encoded symbol and an operation of decoding the encoded symbol on the basis of the determination result.

9 Claims, 10 Drawing Sheets

(51) Int. Cl.
*H04N 19/176* (2014.01)
*H04N 19/13* (2014.01)
*H04N 19/91* (2014.01)
*H04N 19/157* (2014.01)

(58) Field of Classification Search
CPC ...... H04N 19/176; H04N 19/42; H04N 19/70; H04N 13/161; H04N 13/178; H04N 9/8205; H04N 9/8211; H04N 9/8233; H03M 7/4006; H03M 7/40; G06F 13/28; G06F 9/30018; G06F 9/3895; G06F 9/461; G06F 9/5088
USPC ........................................................ 375/240
See application file for complete search history.

(56) References Cited

U.S. PATENT DOCUMENTS

| | | | |
|---|---|---|---|
| 7,656,326 B2 | 2/2010 | Hussain et al. | |
| 8,094,048 B2 | 1/2012 | Park et al. | |
| 8,095,782 B1* | 1/2012 | Danskin | G06F 9/5088 |
| | | | 712/228 |
| 2006/0028359 A1* | 2/2006 | Kim | H03M 7/40 |
| | | | 341/50 |
| 2007/0097850 A1* | 5/2007 | Park | H04N 19/61 |
| | | | 370/202 |

FOREIGN PATENT DOCUMENTS

| | | |
|---|---|---|
| KR | 10-0644713 B1 | 11/2006 |
| KR | 10-0717055 B1 | 5/2007 |

\* cited by examiner

METHOD AND APPARATUS FOR EXECUTING DECODING COMMAND, METHOD AND APPARATUS FOR GENERATING DECODING COMMAND, AND RECORDING MEDIUM

TECHNICAL FIELD

Disclosed embodiments relate to a method of executing a decoding command, an apparatus for executing a decoding command, a method of generating a decoding command, an apparatus for generating a decoding command, and a recording medium.

BACKGROUND ART

Arithmetic coding used in H.264/advanced video coding (AVC) and high efficiency video coding (HEVC) employs binary codes and a simplified arithmetic coding engine. Such a method is referred to as context-adaptive binary arithmetic coding (CABAC). CABAC is a low-complexity algorithm but still places a considerable load on a processor. Therefore, CABAC is frequently processed by hardware at high speed.

The same arithmetic coding engine was adopted as standards of H.264/AVC and HEVC. However, although H.264/AVC and HEVC share the basic arithmetic coding engine, their control and data flow for decoding differ from each other. Therefore, when H.264/AVC and HEVC are processed by hardware, different pieces of decoding hardware should be manufactured.

DETAILED DESCRIPTION OF THE INVENTION

Technical Problem

In a decoding method according to different standards, it is possible to increase a decoding speed by generating a common decoding process with a decoding command and executing the generated decoding command.

Technical Solution

A method of executing a decoding command according to a disclosed embodiment includes: acquiring the decoding command; determining a type of an executable operation on the basis of the acquired decoding command; and performing any one of an operation of storing context information about an encoded symbol and an operation of decoding the encoded symbol on the basis of the determination result.

Advantageous Effects of the Invention

According to an embodiment, it is possible to improve a speed of a decoding process by generating a process which is performed in common by respective codecs of H.264/advanced video coding (AVC) and high efficiency video coding (HEVC) with a decoding command and having the generated decoding command executed by a processor. Also, in an embodiment, a process which is performed in common by respective codecs of H.264/AVC and HEVC is generated using a decoding command, and different processes are configured by separate processors, so that the embodiment can be applied to all different codecs.

BEST MODE

A method of executing a decoding command according to a disclosed embodiment may include: acquiring the decoding command; determining a type of an executable operation on the basis of the acquired decoding command; and performing any one of an operation of storing context information about an encoded symbol and an operation of decoding the encoded symbol on the basis of the determination result.

A method of generating a decoding command according to a disclosed embodiment may include: determining any one of an operation of storing context information about an encoded symbol and an operation of decoding the encoded symbol; and generating a decoding command including information related to the determined operation.

An apparatus for executing a decoding command according to a disclosed embodiment may include: a command acquisition unit configured to acquire the decoding command; a determination unit configured to determine a type of an executable operation on the basis of the acquired decoding command; and a control unit configured to perform any one of an operation of storing context information about an encoded symbol and an operation of decoding the encoded symbol on the basis of the determination result.

An apparatus for generating a decoding command according to a disclosed embodiment may include: an operation determination unit configured to determine any one of an operation of storing the context of an encoded symbol and an operation of decoding the encoded symbol; and a command generation unit configured to generate a decoding command including information related to the determined operation.

MODE OF THE INVENTION

Hereinafter, embodiments of the present invention will be described in detail with reference to the accompanying drawings so that those of ordinary skill in the technical field to which the present invention pertains can readily implement the embodiments. However, the present invention can be implemented in various different forms and is not limited to the embodiments described herein. To clearly describe the present invention, parts irrelevant to the description will be omitted in the drawings, and like elements will be designated by like numerals throughout the specification.

In this specification, when a part is referred to as being "connected" to another part, it may not only be "directly connected" but also may be "electrically connected" to the other part via an intervening device. Also, when a part is referred to as "including" an element, this means that the part does not exclude another element and may further include another element unless stated otherwise.

The present invention will be described in detail below with reference to the accompanying drawings.

Figure 1:
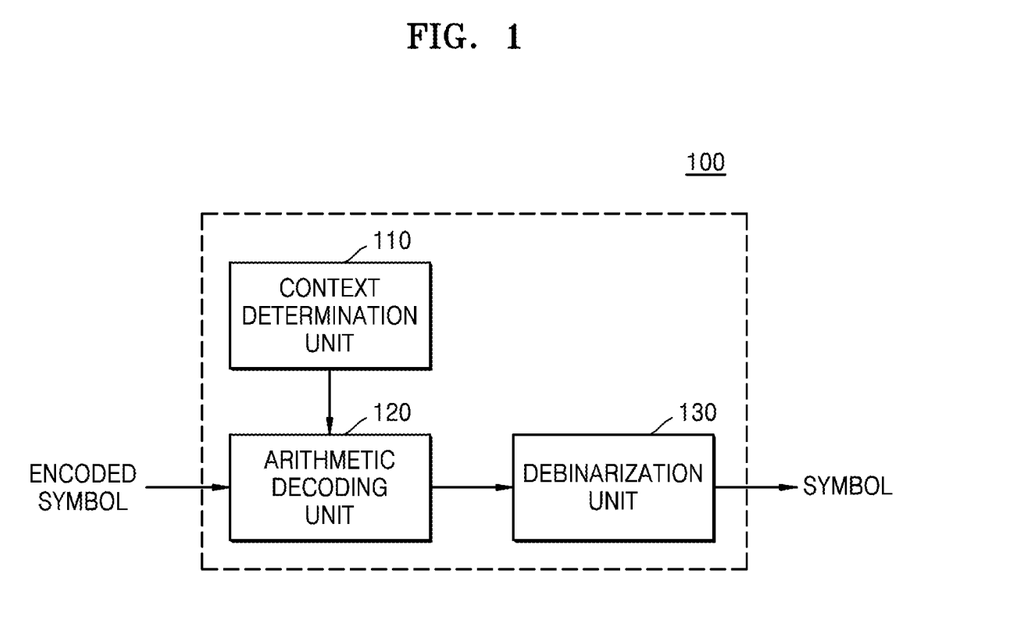
FIG. 1 is a block diagram illustrating a decoding apparatus which executes the context-adaptive binary arithmetic coding (CABAC) algorithm.

FIG. 1 is a block diagram illustrating a decoding apparatus 100 which executes the context-adaptive binary arithmetic coding (CABAC) algorithm.

FIG. 1 shows only elements related to the present embodiment in the decoding apparatus 100 which executes the CABAC algorithm. Therefore, those of ordinary skill in the technical field related to the present embodiment will appreciate that general-use elements other than the elements shown in FIG. 1 may be further included.

Referring to FIG. 1, the decoding apparatus 100 which executes the CABAC algorithm may include a context determination unit 110, an arithmetic decoding unit 120, and a debinarization unit 130.

The context determination unit 110 may determine context for decoding an encoded symbol. The context determination unit 110 may determine different pieces of context according to types of data represented by encoded symbols. For example, the context determination unit 110 may determine different pieces of context for a case in which the encoded symbol represents a motion vector and a case in which the encoded symbol is a residue. Also, the context determination unit 110 may differently determine the context of the encoded symbol to be currently decoded on the basis of encoded symbols which have been previously input.

The arithmetic decoding unit 120 may decode the encoded symbol on the basis of a value of the determined context. In an encoding process of the CABC algorithm, symbols are binarized, and each binary value is encoded. Therefore, when the arithmetic decoding unit 120 decodes the encoded symbol, a value of the binarized symbol is output.

The debinarization unit 130 may acquire a symbol by debinarizing the binarized symbol output from the arithmetic decoding unit 120.

In the CABAC algorithm adopted as standards of H.264/AVC and HEVC, decoding can be basically performed through the process described in FIG. 1. However, since H.264/AVC and HEVC involve different control and data flow, their respective decoding processes do not uniformly proceed overall.

According to an embodiment, it is possible to improve a speed of a decoding process by generating a process which is performed in common by respective codecs of H.264/AVC and HEVC with a decoding command and having the generated decoding command executed by a processor. Also, in an embodiment, a process which is performed in common by respective codecs of H.264/AVC and HEVC is generated using a decoding command, and different processes are configured by separate processors, so that the embodiment can be applied to all different codecs.

Figure 2:
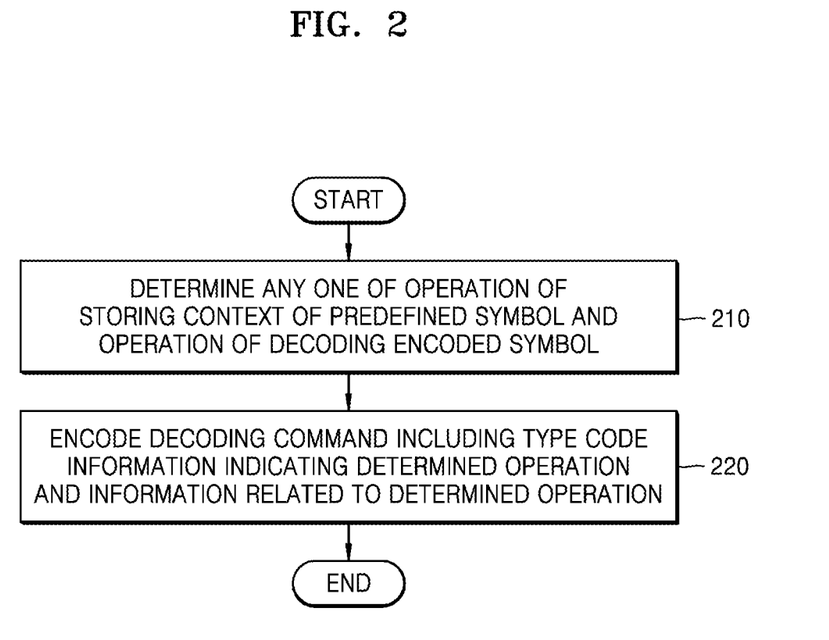
FIG. 2 is a flowchart illustrating a method of generating a decoding command according to an embodiment.

FIG. 2 is a flowchart illustrating a method of generating a decoding command according to an embodiment.

In operation 210, an apparatus for generating a decoding command may determine any one of an operation of storing the context of a predefined symbol and an operation of decoding an encoded symbol. The apparatus for generating a decoding command may acquire preset information for determining an operation corresponding to at least one encoded symbol. The apparatus for generating a decoding command may determine an operation corresponding to each of the at least one encoded symbol on the basis of the acquired preset information.

In operation 220, the apparatus for generating a decoding command may generate a decoding command including type code information indicating the determined operation and information related to the determined operation.

When the determined operation is the operation of storing the context of a predefined symbol, the apparatus for generating a decoding command may generate a first decoding command including a first type code. Here, the first decoding command may include information on a type of a memory in which context or a context address is stored and information on an address value in the memory at which the context or the context address is stored. The first decoding command according to an embodiment may include a first context of the predefined symbol and information on an address in a first context memory at which the first context is stored when the operation determined by the apparatus for generating a decoding command is an operation of storing the first context. According to another embodiment, when the operation determined by the apparatus for generating a decoding command is an operation of storing a second context address of an address value of a symbol to be decoded next, the first decoding command may include a second context address value and information on the address value of a second context memory at which the second context address value is stored.

Meanwhile, when the determined operation is the operation of decoding an encoded symbol, the apparatus for generating a decoding command may generate a second decoding command including a second type code.

The second decoding command may include information on the address in the first context memory at which the context of the predefined symbol is stored, index information about an address in the second context memory at which the context of the symbol to be decoded next is stored, and decoding mode information about a method of decoding the encoded symbol. Here, decoding mode information may include the number of encoded symbols on which a decoding operation is to be performed, information on a method of selecting context, and information on a method of outputting a result of performing a decoding operation on the encoded symbol.

Figure 3:
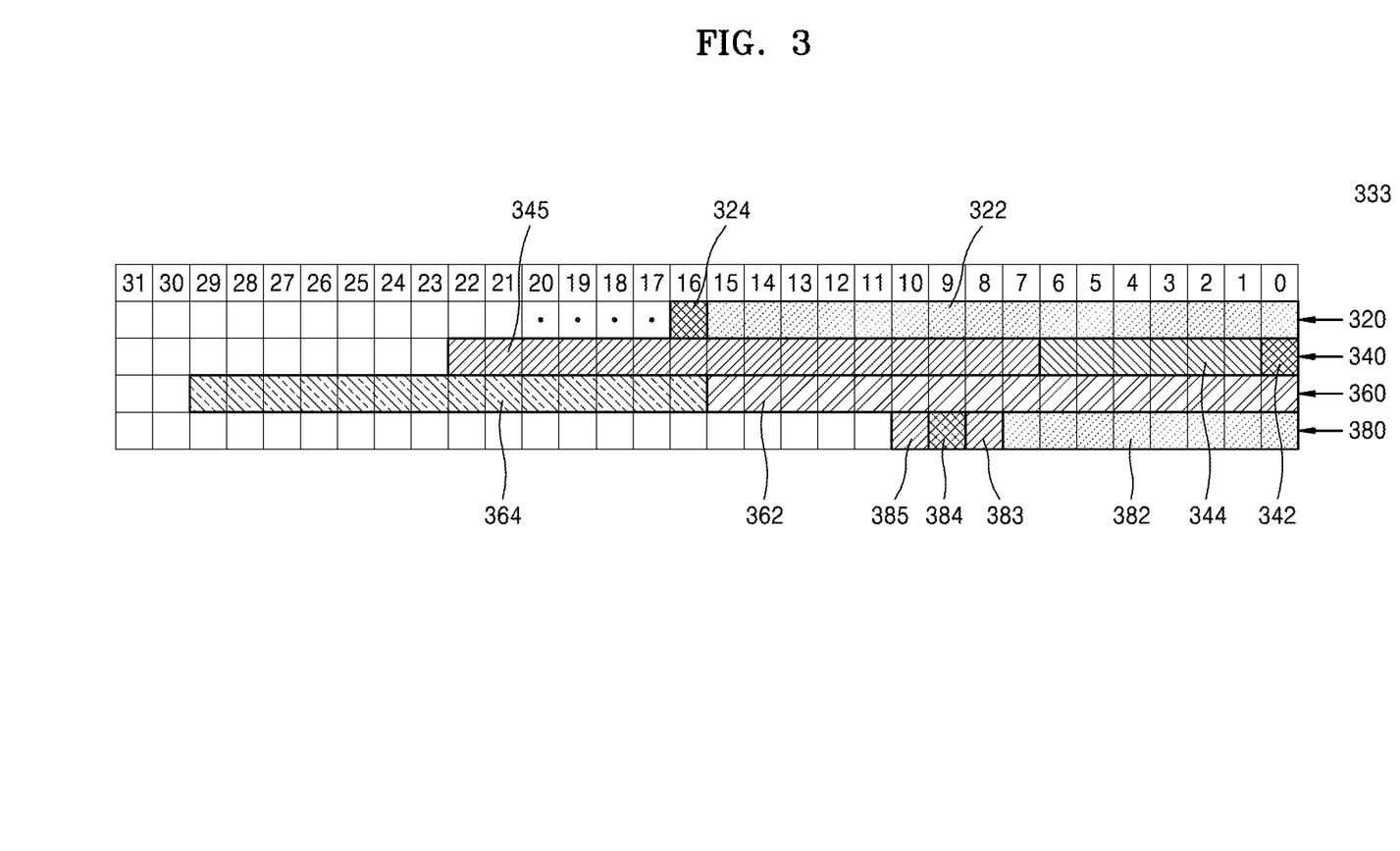
FIG. 3 is a diagram showing 32-bit input parameters of decoding commands according to an embodiment.

FIG. 3 is a diagram showing 32-bit input parameters of decoding commands according to an embodiment. Different arithmetic operations are performed according to input parameters of decoding commands, and these arithmetic operations are referred to as a first decoding command and a second decoding command.

Referring to FIG. 3, FIG. 3 may include a first decoding command (referred to as "1-1 decoding command 320" and "1-2 decoding command 340" below) and a second decoding command (referred to as "2-1 decoding command 360" and "2-2 decoding command 380" below).

The 1-1 decoding command and the 1-2 decoding command may be determined according to locations in the first decoding command. For example, a 32-bit command located in front in the first decoding command may be the 1-1 decoding command, and a 32-bit command located thereafter in the first decoding command may be the 1-2 decoding command.

The 1-1 decoding command 320 may include address information 322 at which context is currently stored and an information type code 324 indicating a type of stored information. In the 1-2 decoding command 340, a most probable symbol (MPS) 342, a state 344, and information 345 on an address value at which the context of a symbol following a predefined symbol is stored may be stored.

The 2-1 decoding command 360 may include information 362 on a memory address of first context at which the first context of the predefined symbol which is a current decoding target is stored and information 364 of a memory address value at which information on a memory address of second context of the symbol following the predefined symbol is stored.

An apparatus for executing a decoding command according to an embodiment may read the first context required to perform decoding from the first context memory by executing the 2-1 decoding command 360 and simultaneously acquire information on a memory address value at which information on the memory address of the second context required to decode the encoded symbol, which is the next decoding target, is stored.

In the 2-2 decoding command 380, a number 382 of target loops, decoding mode information 383, a predefined symbol 384, and information 385 on a method of outputting decoding results may be stored.

The decoding mode information 383 according to an embodiment may include information on a normal mode, a bypass mode, an init mode, and a termination mode. In the normal mode, context required for decoding can be read from the memory. Meanwhile, in the bypass mode, context can be determined by setting the probabilities of binary signals of 0 and 1 to the same value. When a command set to the init mode is received, a loop count can be set to zero. Meanwhile, when a command set to the termination mode is received, it is possible to stop a decoding operation or an operation of storing context.

Figure 4:
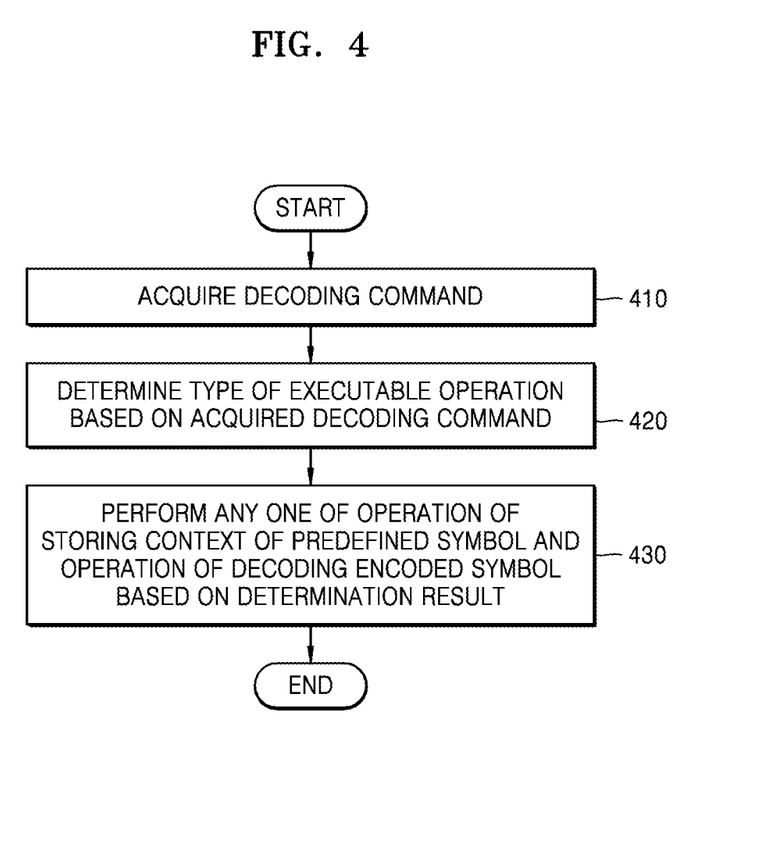
FIG. 4 is a flowchart illustrating a method of executing a decoding command according to an embodiment.

FIG. 4 is a flowchart illustrating a method of executing a decoding command according to an embodiment.

In operation 410, an apparatus for executing a decoding command may acquire a decoding command. Here, the decoding command may include information on a process which is executed in common by respective codecs of H.264/AVC and HEVC in a decoding method employing the CABAC algorithm. The process executed in common will be described in detail below in operation 430.

Although decoding command can be implemented in various forms, a 32-bit decoding command will be described as an example herein for convenience.

In operation 420, the apparatus for executing a decoding command may determine a type of an operation that can be executed on the basis of the acquired decoding command. The apparatus for executing a decoding command may compare a database in which relationship information between at least one decoding command and a type of operation is prestored with the acquired decoding command. The apparatus for executing a decoding command may determine a type of an executable operation on the basis of the comparison result.

In operation 430, the apparatus for executing a decoding command may perform any one of an operation of storing context information about a predefined symbol and an operation of decoding an encoded symbol on the basis of an extracted type code.

For example, when the extracted type code is a first type code, the apparatus for executing a decoding command may store the context of the predefined symbol. Here, the context of the predefined symbol may be determined on the basis of a type of data indicated by an encoded symbol and encoded symbols which have been previously acquired. The apparatus for executing a decoding command acquires the context of the encoded symbol from a module which is included in the apparatus and determines the context of encoded symbols.

Context may be represented by any one symbol having a high probability of occurrence (referred to as "MPS" below) between 0 and 1 and a corresponding number (referred to as "state" below) in a table showing probabilities of occurrence of the MPS. In general, the higher the state, the higher the probability of occurrence of the MPS. However, this is merely exemplary, and the present invention is not limited thereto.

A first decoding command including a first type code according to an embodiment may include context, information on a type of a memory in which the context is stored, and information on an address value in the memory at which the context is stored.

Meanwhile, when the extracted type code is a second type code, the apparatus for executing a decoding command may decode an encoded symbol.

A second decoding command including a second type code according to an embodiment may include information on a memory address at which the context of an encoded symbol is stored, index information about a memory address at which the context of a symbol to be decoded next is stored, and decoding mode information about a method of decoding the encoded symbol. Here, the index information may include information on another memory address storing the information on the memory address at which the context of the symbol to be decoded next is stored Meanwhile, the decoding mode information may include the number of encoded symbols on which a decoding operation is to be performed, information on a method of selecting context, and information on a method of outputting results of performing the decoding operation on the encoded symbols.

The number of encoded symbols on which a decoding operation is to be performed will be described in detail below with reference to FIG. 4. The information on the method of selecting context may include information on whether to perform decoding by reading context from the memory (referred to as "normal mode" below) or by determining context on the assumption that the probabilities of occurrence of binary signals of 0 and 1 are the same (referred to as "bypass mode" below).

Meanwhile, the method of outputting results of performing the decoding operation on the encoded symbols may include information on whether to output symbols output as results of performing the decoding operation beginning with the leftmost bit (the most significant bit (MSB)) or the rightmost bit (the least significant bit (LSB)) in a bitstream.

Figure 5:
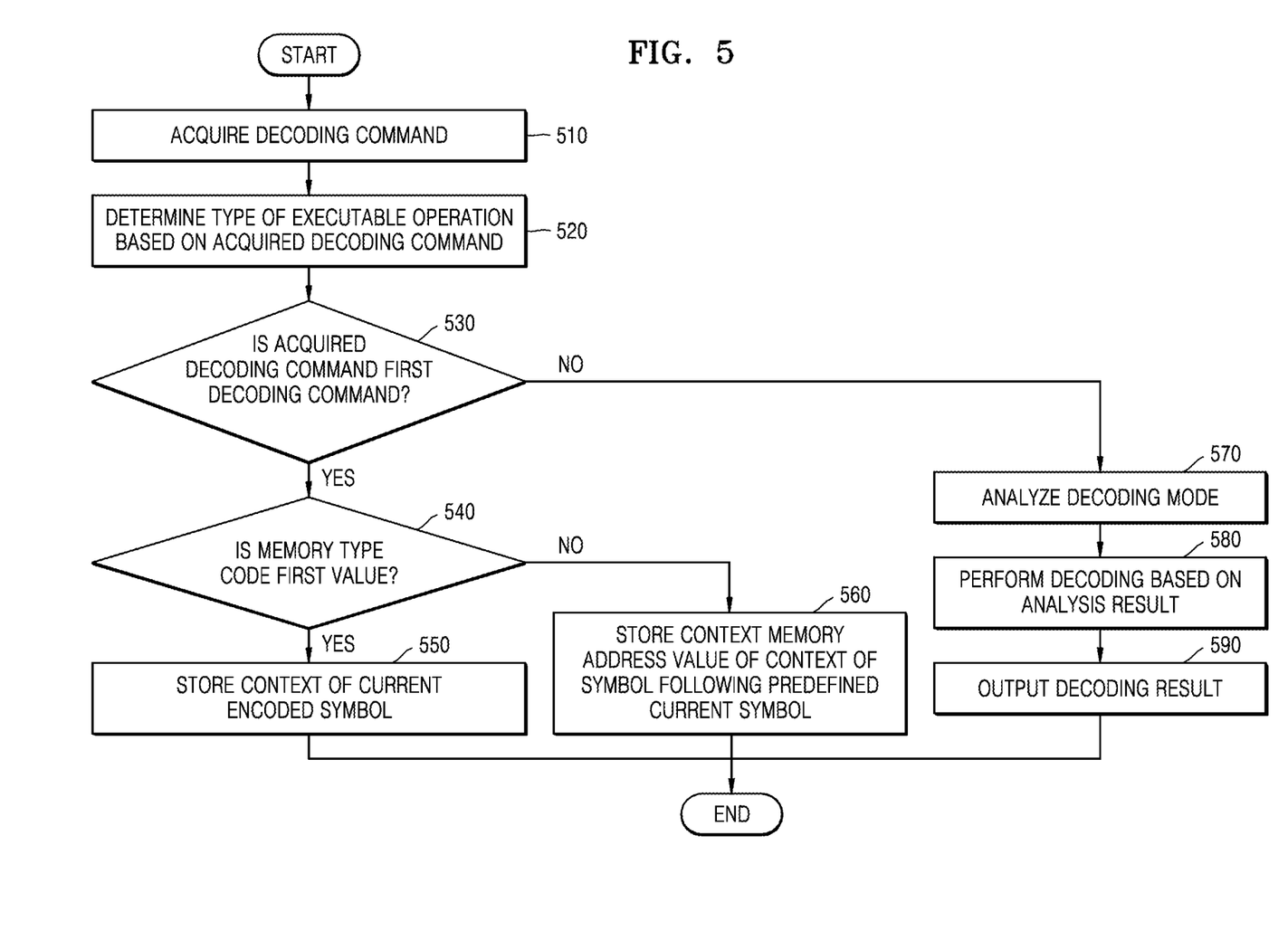
FIG. 5 is a flowchart illustrating, in detail, a method for a processor for executing a decoding command to perform an operation on the basis of an acquired decoding command according to an embodiment.

FIG. 5 is a flowchart illustrating, in detail, a method for an apparatus for executing a decoding command to perform an operation on the basis of an acquired decoding command according to an embodiment.

In operation 510, the apparatus for executing a decoding command may acquire a decoding command. Here, operation 510 may correspond to operation 410 of FIG. 4.

In operation 520, the apparatus for executing a decoding command may extract a type code including type information of an operation performed on the basis of the acquired decoding command from the acquired decoding command. The type code may be displayed on the basis of a predetermined bit among bits constituting the decoding command. Here, operation 520 may correspond to operation 420 of FIG. 4.

In operation 530, the apparatus for executing a decoding command may determine whether or not the acquired decoding command is a first decoding command. When the type code included in the acquired decoding command is a first type code, the apparatus for executing a decoding command may determine the acquired decoding command as a first decoding command. Meanwhile, when the type code included in the acquired decoding command is a second type code, the apparatus for executing a decoding command may determine the acquired decoding command as a second decoding command.

In operation 540, the apparatus for executing a decoding command may determine whether or not a memory type code included in the first decoding command is a first value. Here, the memory type code may include information on a type of a memory in which context is stored. The memory in which context is stored may include a first context memory and a second context memory. In the first context memory, the context of a predefined symbol which is a current decoding target may be stored. Meanwhile, in the second context memory, an address value of the context of an encoded symbol which is the next decoding target may be stored.

In operation 550, the apparatus for executing a decoding command may store context included in the first decoding command having the memory type code of a first value. Here, the apparatus for executing a decoding command may store, in the first context memory, the context included in the first decoding command as the context of the predefined current symbol.

In operation 560, the apparatus for executing a decoding command may store the context included in the first decoding command having the memory type code of a second value. Here, the apparatus for executing a decoding command may store, in the second context memory, the context included in the first decoding command as the address value of the context of a symbol to be decoded following the predefined current symbol.

In operation 570, the apparatus for executing a decoding command may analyze a decoding mode which is applied to encoded symbols on the basis of the second decoding command including a second type code. Meanwhile, decoding mode information may include the number of encoded symbols on which a decoding operation is to be performed, information on a method of selecting context, and information on a method of outputting results of decoding the encoded symbols.

In operation 580, the apparatus for executing a decoding command may decode encoded symbols on the basis of a result of analyzing the decoding mode. The apparatus for executing a decoding command may determine the number of encoded symbols to be decoded on the basis of the analysis result. This will be described in detail below with reference to FIG. 4. Also, the apparatus for executing a decoding command may determine whether to read the context of encoded symbols from the memory or determine the context on the assumption that the probabilities of occurrence of binary signals are the same.

In operation 590, the apparatus for executing a decoding command may output the decoding result. The apparatus for executing a decoding command may determine whether to output symbols acquired as the results of performing the decoding operation on the basis of the analysis result of operation 570 beginning with the leftmost bit (the MSB) or the rightmost bit (the LSB) in a bitstream. The apparatus for executing a decoding command may output the symbols acquired as the results of performing the decoding operation on the basis of any one of an MSB method and an LSB method.

Figure 6:
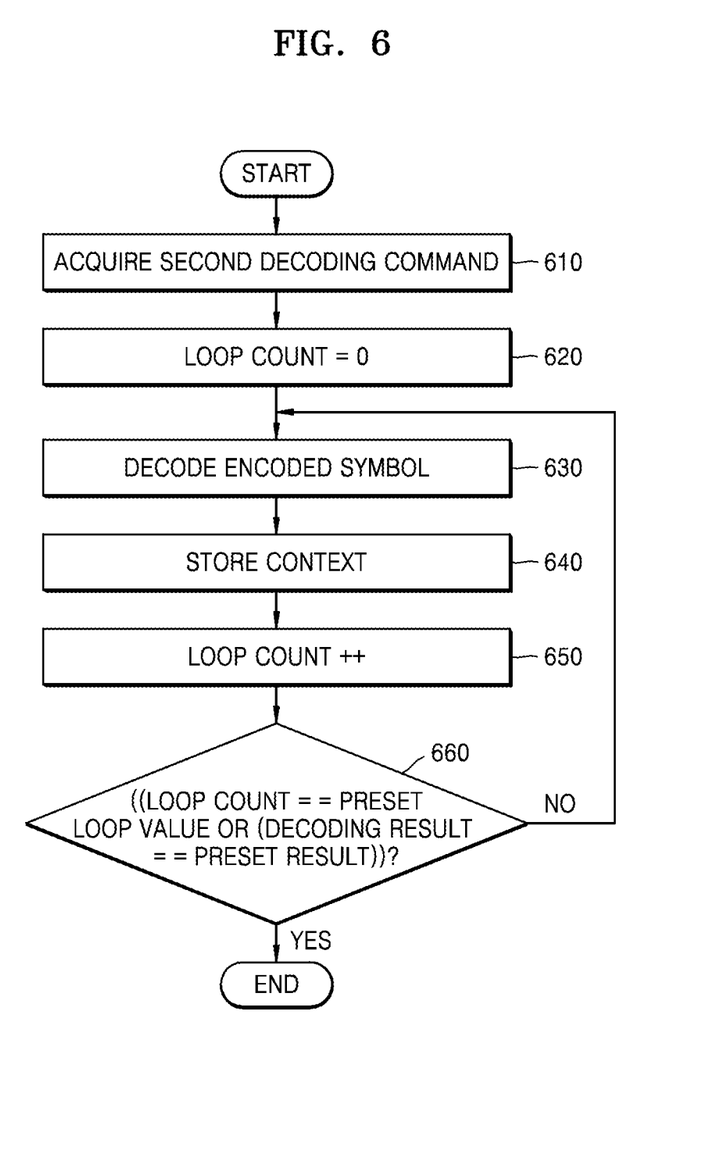
FIG. 6 is a flowchart illustrating, in detail, a method for a processor for executing a decoding command to perform a decoding operation according to an embodiment.

FIG. 6 is a flowchart illustrating, in detail, a method for an apparatus for executing a decoding command to perform a decoding operation according to an embodiment.

In operation 610, the apparatus for executing a decoding command may acquire a second decoding command. Here, the second decoding command may include a second type code. The apparatus for executing a decoding command may perform an operation of decoding an encoded symbol on the basis of the acquired second decoding command.

In operation 620, the apparatus for executing a decoding command may set a loop count to zero. Here, a loop count value is increased by one each time an encoded symbol is decoded.

In operation 630, the apparatus for executing a decoding command may decode an encoded symbol. The apparatus for executing a decoding command may decode the encoded symbol on the basis of the acquired second decoding command. For example, when a result of analyzing the second decoding command indicates that a decoding mode applied to the encoded symbol is the normal mode, the apparatus for executing a decoding command may read context which is the basis of decoding the encoded symbol from the memory. Here, information on a location in the memory at which the context is stored may be included in the second decoding command.

In operation 640, when decoding of the encoded symbol has been finished, the apparatus for executing a decoding command may store context which has been newly determined in consideration of the decoding result in the memory. In the CABAC algorithm, context may vary according to encoded symbols which have been previously input. Therefore, when decoding of a certain encoded symbol is finished, the context of an encoded symbol to be decoded next may have a changed value although the context is stored at the same location in the memory.

In operation 650, when decoding of the encoded symbol has been finished, the apparatus for executing a decoding command may increase the value of the loop count. The apparatus for executing a decoding command according to an embodiment may decode as many encoded symbols as a preset loop count value in the same decoding mode.

In operation 660, the apparatus for executing a decoding command may determine whether or not the increased loop count value is identical to a preset loop value or whether or not a value output as a decoding result is identical to a preset output value.

The apparatus for executing a decoding command according to an embodiment may repeatedly perform operation 630 to operation 660 until the increased loop count value becomes identical to the preset loop value. Here, the preset loop value may represent how many encoded symbols the apparatus for executing a decoding command is to decode. For example, when the preset loop value is three, the apparatus for executing a decoding command may decode three encoded symbols.

Meanwhile, the apparatus for executing a decoding command may repeatedly perform operation 630 to operation 660 until the value output as an encoding result becomes identical to the preset output value. For example, when the preset output value is zero, the apparatus for executing a decoding command may repeatedly perform operation 630 to operation 660 until the value output as an encoding result becomes zero. This method may be useful for decoding a Golomb code.

Figure 7:
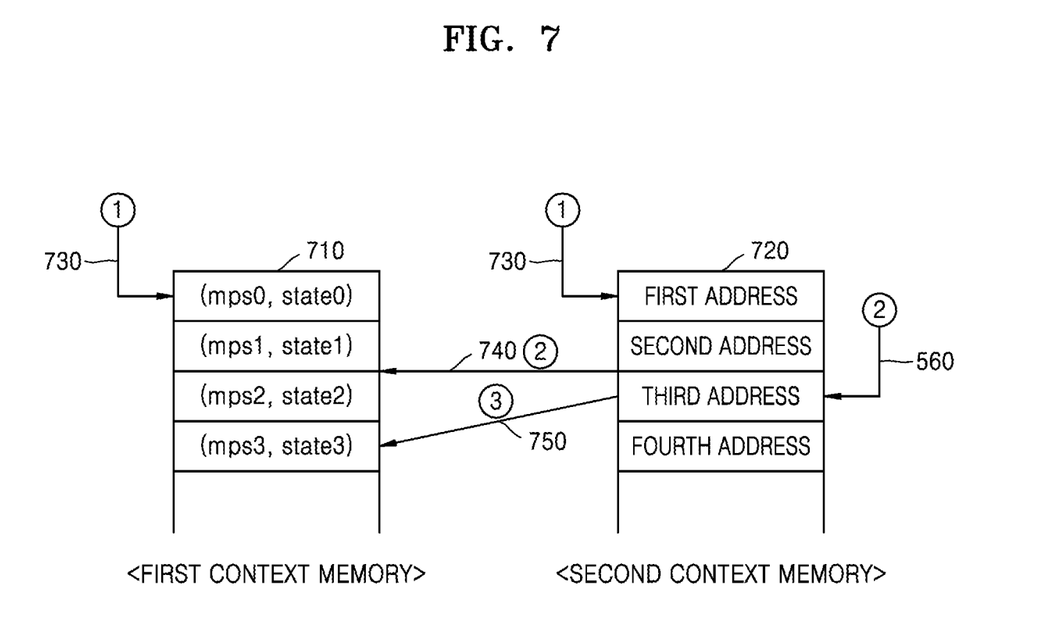
FIG. 7 is a diagram illustrating, in detail, a method of reading context from a memory according to an embodiment when a processor for executing a decoding command performs a decoding operation.

FIG. 7 is a diagram illustrating, in detail, a method of reading context from a memory according to an embodiment when an apparatus for executing a decoding command performs a decoding operation.

Referring to FIG. 7, a memory for storing context may include a first context memory 702 and a second context memory 704. In FIG. 7, a preset loop count may be set to three.

In operation 710, the apparatus for executing a decoding command may read first context of a first target symbol, which is an encoded symbol to be currently decoded, stored in the first context memory 702. At the same time, from the second context memory 704, the apparatus for executing a decoding command may read index information about a memory address at which the context of a second target symbol, which is an encoded symbol to be decoded next, is stored.

The apparatus for executing a decoding command may decode at least one encoded symbol. For example, when the context of the second target symbol which is decoded after the first target symbol is not affected by a result of decoding the first target symbol, it is possible to increase a decoding speed by simultaneously reading the first context of the first target symbol and the information on the memory address at which the second context of the second target symbol is stored.

In operation 720, the apparatus for executing a decoding command may read the second context of the second target symbol from the first context memory 702 on the basis of the index information about the address, at which the second context of the second target symbol is stored, acquired in operation 710. At the same time, the apparatus for executing a decoding command may read, from the second context memory 704, index information an memory address at which third context of a third target symbol, which is an encoded symbol to be decoded next, is stored.

In operation 730, the apparatus for executing a decoding command may read the third context of the third target symbol from the first context memory 702 on the basis of the index information of the address, at which the third context of the third target is stored, acquired in operation 720. Meanwhile, in FIG. 7, a preset loop count is 2[3]. Therefore, when decoding of three encoded symbols is finished, the loop count is reset to zero, and the apparatus for executing a decoding command may decode a new encoded symbol on the basis of a new decoding mode.

Figure 8:
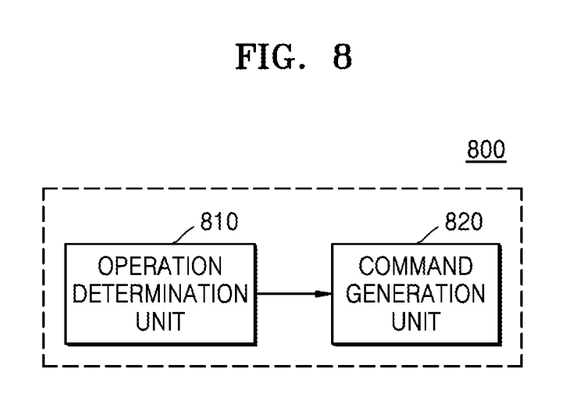
FIG. 8 is a block diagram illustrating an apparatus for generating a decoding command according to an embodiment.

FIG. 8 is a block diagram illustrating an apparatus 800 for generating a decoding command according to an embodiment.

As shown in FIG. 8, the apparatus 800 for generating a decoding command may include an operation determination unit 810 and a command generation unit 820. However, all the elements shown in the drawing are not essential elements. The apparatus 800 for generating a decoding command may be implemented by more or less elements than the elements shown in the drawing.

The operation determination unit 810 may determine any one of an operation of storing the context of an encoded symbol and an operation of decoding the encoded symbol.

The command generation unit 820 may generate a decoding command including information related to the determined operation. Also, when the determined operation is an operation of storing the context of the encoded symbol, the command generation unit 820 may determine any one of an operation of storing the context of the encoded symbol in the first context memory and an operation of storing an address value of the context of a symbol following the encoded symbol in the second context memory.

Meanwhile, the command generation unit 820 may generate a first decoding command for performing the determined operation.

Also, when the determined operation is an operation of decoding the encoded symbol, the command generation unit 820 may generate a second decoding command including information on a memory address at which the context of the encoded symbol is stored, information on a memory address at which a memory address of the context of a symbol following the encoded symbol is stored, and decoding mode information about a method of decoding the encoded symbol.

Figure 9:
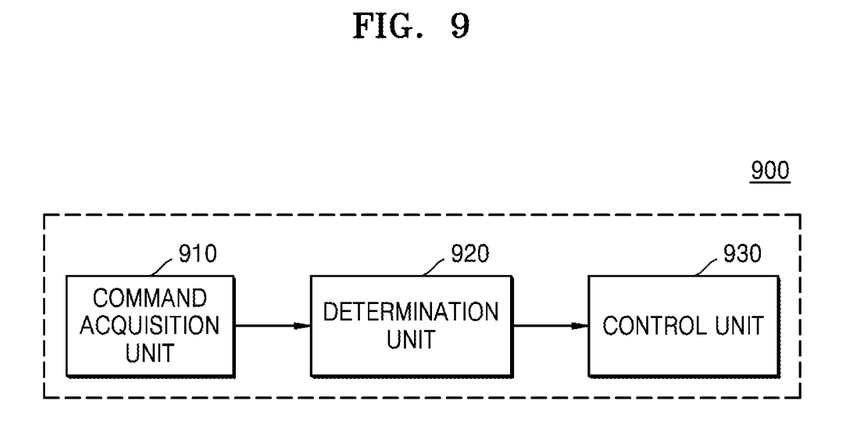
FIGS. 9 and 10 are block diagrams illustrating a processor for executing a decoding command according to an embodiment.
Figure 10:
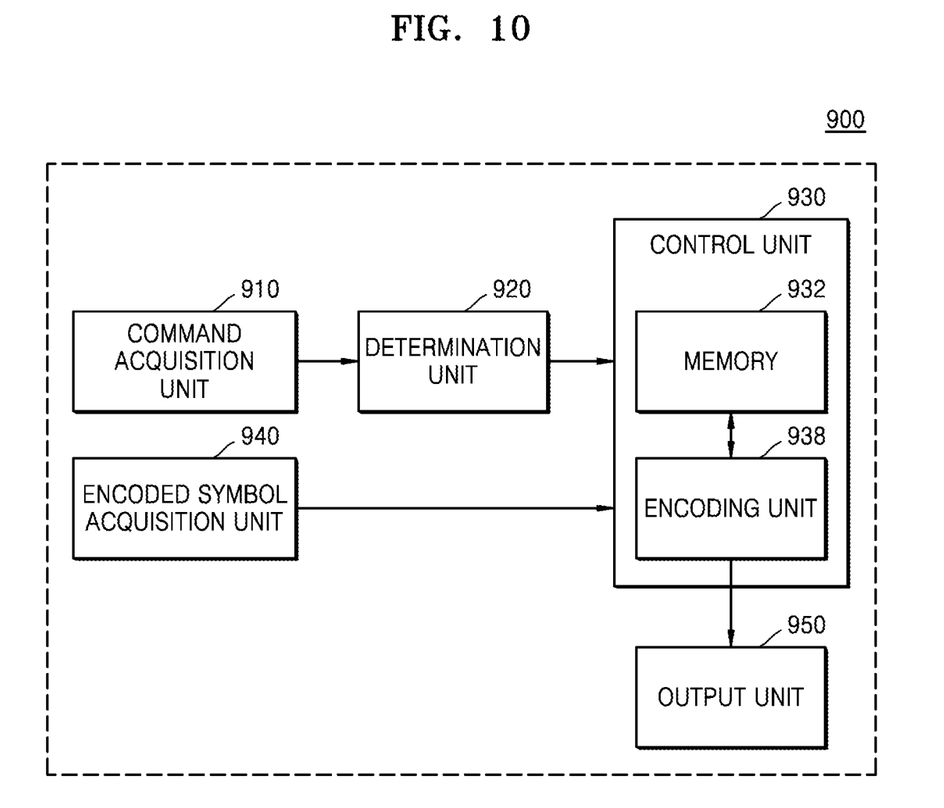

FIGS. 9 and 10 are block diagrams illustrating an apparatus 900 for executing a decoding command according to an embodiment.

As shown in FIG. 9, the apparatus 900 for executing a decoding command according to an embodiment may include a command acquisition unit 910, a determination unit 920, and a control unit 930. However, all the elements shown in the drawing are not essential elements. The apparatus 900 for executing a decoding command may be implemented by more or less elements than the elements shown in the drawing.

For example, the apparatus 900 for executing a decoding command may further include an encoded symbol acquisition unit 940 and an output unit 950.

The aforementioned elements will be described below in sequence.

The command acquisition unit 910 may acquire a decoding command.

The determination unit 920 may determine a type of an operation which can be executed on the basis of the acquired decoding command. The determination unit 920 may compare a database in which relationship information between at least one decoding command and a type of operation is prestored with the acquired decoding command. Also, the determination unit 920 may determine a type of an executable operation on the basis of the comparison result.

The control unit 930 may perform any one of an operation of storing context information about an encoded symbol and an operation of decoding the encoded symbol on the basis of an extracted type code. For example, when the extracted type code is a first type code, the control unit 930 may store the context of an encoded symbol. Here, the context of the encoded symbol may be determined on the basis of a type of data indicated by the encoded symbol and encoded symbols which have been previously acquired.

An apparatus according to the present invention may include a processor, a memory for storing and executing program data, a permanent storage such as a disk drive, a communication port for communicating with an external device, a user interface device such as a touch panel, keys, or buttons, and so on. Methods embodied as a software module or an algorithm may be stored on computer-readable recording media as computer-readable code or program commands executable by the processor. The computer-readable recording media include magnetic storage media (e.g., read-only memories (ROMs), random-access memories (RAMs), floppy disks, hard disks, etc.), optical recording media (e.g., compact disc (CD)-ROMs, digital versatile discs (DVDs), etc.), and so on. The computer-readable recording media may also be distributed over computer systems connected through a network so that the computer-readable code can be stored and executed in a distributed manner. The media can be read by a computer, stored in a memory, and executed by the processor.

All references including publications, patent applications, patents, etc. cited in the present invention are incorporated by reference to the same extent as if each reference were individually and specifically indicated to be incorporated by reference and were set forth in its entirety herein.

To facilitate understanding of the present invention, reference numerals have been provided in the exemplary embodiments shown in the drawings. Although particular terms have been used to describe the embodiments, the present invention is not limited by the particular terms and may encompass all elements that may be generally conceived by those of ordinary skill in the art.

The present invention may be described in terms of functional blocks and various processing operations. Such functional blocks may be implemented by any number of hardware and/or software components that execute particular functions. For example, the present invention may employ various integrated circuit (IC) components, such as memory elements, processing elements, logic elements, look-up tables, etc., which may execute various functions under the control of one or more microprocessors or other control devices. Similarly, where the elements of the present invention are implemented by software programming or software elements, the present invention can be implemented by any programming or scripting language, such as C, C++, Java, assembler, etc., with various algorithms implemented by any combination of data structures, processes, routines, or other programming elements. Functional aspects may be implemented by an algorithm that is executed in one or more processors. Also, the present invention may employ the related art for electronic environment setting, signal processing, and/or data processing. Terms such as "mechanism," "element," "means," and "configuration" may be used in a broad sense and are not limited to mechanical and physical components. The terms may include the meaning of a series of software routines in conjunction with a processor or so on.

Particular implementations described in the present invention are exemplary and do not limit the scope of the present invention in any way. For the sake of conciseness, descriptions of related electronic configurations, control systems, software, and other functional aspects of the systems may be omitted. Also, the connection lines or connection members between elements shown in the drawings represent exemplary functional connections and/or physical or logical connections, and may be presented as various alternative or additional functional connections, physical connections, or logical connections in a practical apparatus. Also, no element may be essential to the practice of the present invention unless the element is specifically described as "essential," "crucial," or so on.

The invention claimed is:

1. A method of executing a decoding command, the method comprising:
   acquiring the decoding command;
   obtaining a type code included in the decoding command;
   identifying the type code included in the decoding command, wherein the type code indicates one of a plurality of operations including an operation of storing context information of a current encoded symbol, an operation of storing information on an address value at which context information of a symbol following the encoded symbol is stored and an operation of decoding the encoded symbol;
   determining an operation corresponding to the identified type code; and
   performing the determined operation based on information included in the decoding command,
   wherein the determining of the operation comprises comparing a database, in which relationship information between at least one decoding command and a type of operation is prestored, with the acquired decoding command, and
   wherein the performing of the operation comprises:
   performing the operation of storing context information of the encoded symbol when a result of the comparison indicates that the acquired decoding command is a first decoding command; and
   performing the operation of decoding the encoded symbol when the result of the comparison indicates that the acquired decoding command is a second decoding command,
   wherein the operation of decoding begins with a leftmost bit (most significant bit MSB) or a rightmost bit (least significant bit LSB) in a bitstream, and
   wherein the method further comprises determining whether or not a loop count value is identical to a preset loop value.

2. The method of claim 1, wherein the performing of the operation of storing the context information comprises performing any one of the operation of storing context information of the current encoded symbol in a first context memory and the operation of storing, in a second context memory, information on an address value at which context information of a symbol following the encoded symbol is stored.

3. A method of generating a decoding command, the method comprising:
   determining any one of an operation of storing context information about an encoded symbol and an operation of decoding the encoded symbol; and
   generating a decoding command including a type code indicating the determined operation,
   wherein the type code included in the decoding command indicates one of a plurality of operations including an operation of storing context information of a current encoded symbol, an operation of storing information on an address value at which context information of a symbol following the encoded symbol is stored and an operation of decoding the encoded symbol,
   wherein the method further comprises:
   comparing a database, in which relationship information between at least one decoding command and a type of operation is prestored, with the decoding command;
   performing the operation of storing context information of the encoded symbol when a result of the comparison indicates that the decoding command is a first decoding command; and
   performing the operation of decoding the encoded symbol when the result of the comparison indicates that the decoding command is a second decoding command, wherein the operation of decoding begins with a leftmost bit (most significant bit MSB) or a rightmost bit (least significant bit LSB) in a bitstream, and wherein the method further comprises determining whether or not a loop count value is identical to a preset loop value.

4. The method of claim 3, wherein the generating of the decoding command comprises:

generating the first decoding command when the determined operation is the operation of storing context information about the encoded symbol; and generating the second decoding command when the determined operation is the operation of decoding the encoded symbol.

5. The method of claim 3, wherein the generating of the decoding command comprises:

when the determined operation is the operation of storing the context information about the encoded symbol, determining any one of the operation of storing the context information of the encoded symbol in a first context memory and the operation of storing an address value of context information of a symbol following the encoded symbol in a second context memory; and generating the first decoding command for performing the determined operation.

6. The method of claim 3, wherein the generating of the decoding command comprises:

when the determined operation is the operation of decoding the encoded symbol, generating the second decoding command including information on a memory address at which the context information of the encoded symbol is stored, information on a memory address value at which a memory address of context information of a symbol following the encoded symbol is stored, and decoding mode information about a method of decoding the encoded symbol.

7. An apparatus for executing a decoding command, the apparatus comprising:

at least one processor configured to:
acquire the decoding command;
obtain a type code included in the decoding command;
identify the type code included in the decoding command, wherein the type code indicates one of a plurality of operations including an operation of storing context information of a current encoded symbol, an operation of storing information on an address value at which context information of a symbol following the encoded symbol is stored and an operation of decoding the encoded symbol;

determine an operation corresponding to the identified type code; and perform the determined operation based on information included in the decoding command, wherein the at least one processor compares a database, in which relationship information between at least one decoding command and a type of operation is pre-stored, with the acquired decoding command, performs the operation of storing context information of the encoded symbol when a result of the comparison indicates that the acquired decoding command is a first decoding command, and performs the operation of decoding the encoded symbol when the result of the comparison indicates that the acquired decoding command is a second decoding command, wherein the at least one processor performs the operation of decoding beginning with a leftmost bit (most significant bit MSB) or a rightmost bit (least significant bit LSB) in a bitstream, and wherein the at least one processor determines whether or not a loop count value is identical to a preset loop value.

8. The apparatus of claim 7, wherein the at least one processor performs any one of the operation of storing the context information of a current encoded symbol in a first context memory and the operation of storing, in a second context memory, information on an address value at which context information of a symbol following the encoded symbol is stored.

9. A non-transitory computer-readable recording medium storing a program for causing a computer to execute the method of claim 1.

* * * * *